United States Patent
Hara et al.

(10) Patent No.: US 9,857,797 B2
(45) Date of Patent: Jan. 2, 2018

(54) STRUCTURE DISPOSED WITH PERIPHERAL INFORMATION DETECTION SENSOR, AND SELF-DRIVING VEHICLE

(71) Applicant: TOYOTA JIDOSHA KABUSHIKI KAISHA, Toyota-shi, Aichi-ken (JP)

(72) Inventors: Yasuhiro Hara, Odawara (JP); Tatsuya Shimizu, Okazaki (JP); Takuya Yabe, Makinohara (JP); Misato Mizuuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/957,092

(22) Filed: Dec. 2, 2015

(65) Prior Publication Data

US 2016/0291150 A1    Oct. 6, 2016

(30) Foreign Application Priority Data

Mar. 30, 2015  (JP) .................. 2015-068562

(51) Int. Cl.
*G01C 22/00*    (2006.01)
*G05D 1/00*    (2006.01)
*G05D 1/02*    (2006.01)
*G01S 17/93*    (2006.01)
*G01S 7/481*    (2006.01)
*G01S 7/02*    (2006.01)
*G01S 13/93*    (2006.01)

(52) U.S. Cl.
CPC .......... *G05D 1/0231* (2013.01); *G01S 7/4813* (2013.01); *G01S 17/936* (2013.01); *G05D 1/0088* (2013.01); *G05D 1/0257* (2013.01); *G01S 2007/027* (2013.01); *G01S 2013/9385* (2013.01); *G01S 2013/9392* (2013.01)

(58) Field of Classification Search
CPC ... G01S 7/4813; G01S 17/936; G05D 1/0088; G05D 1/0257
USPC .......................................................... 701/23
See application file for complete search history.

(56) References Cited

U.S. PATENT DOCUMENTS

2010/0020306 A1    1/2010    Hall

FOREIGN PATENT DOCUMENTS

| JP | H11-78717 A | 3/1999 |
|----|-------------|--------|
| JP | 2004-196184 A | 7/2004 |
| JP | 2004196184 A5 * | 7/2004 |

* cited by examiner

*Primary Examiner* — Maceeh Anwari
(74) *Attorney, Agent, or Firm* — Oliff PLC

(57) ABSTRACT

A structure disposed with a peripheral information detection sensor includes: a peripheral information detection sensor that is disposed at a window frame portion of a side surface of a vehicle and that is equipped with a detection component that detects peripheral information relating to the area around the vehicle; a window member that is attached to the window frame portion and covers the peripheral information detection sensor from an exterior of the vehicle, with at least the section of the window member that opposes the peripheral information detection sensor being opaque or translucent; and an interior member that covers the peripheral information detection sensor from the vehicle interior side.

5 Claims, 15 Drawing Sheets

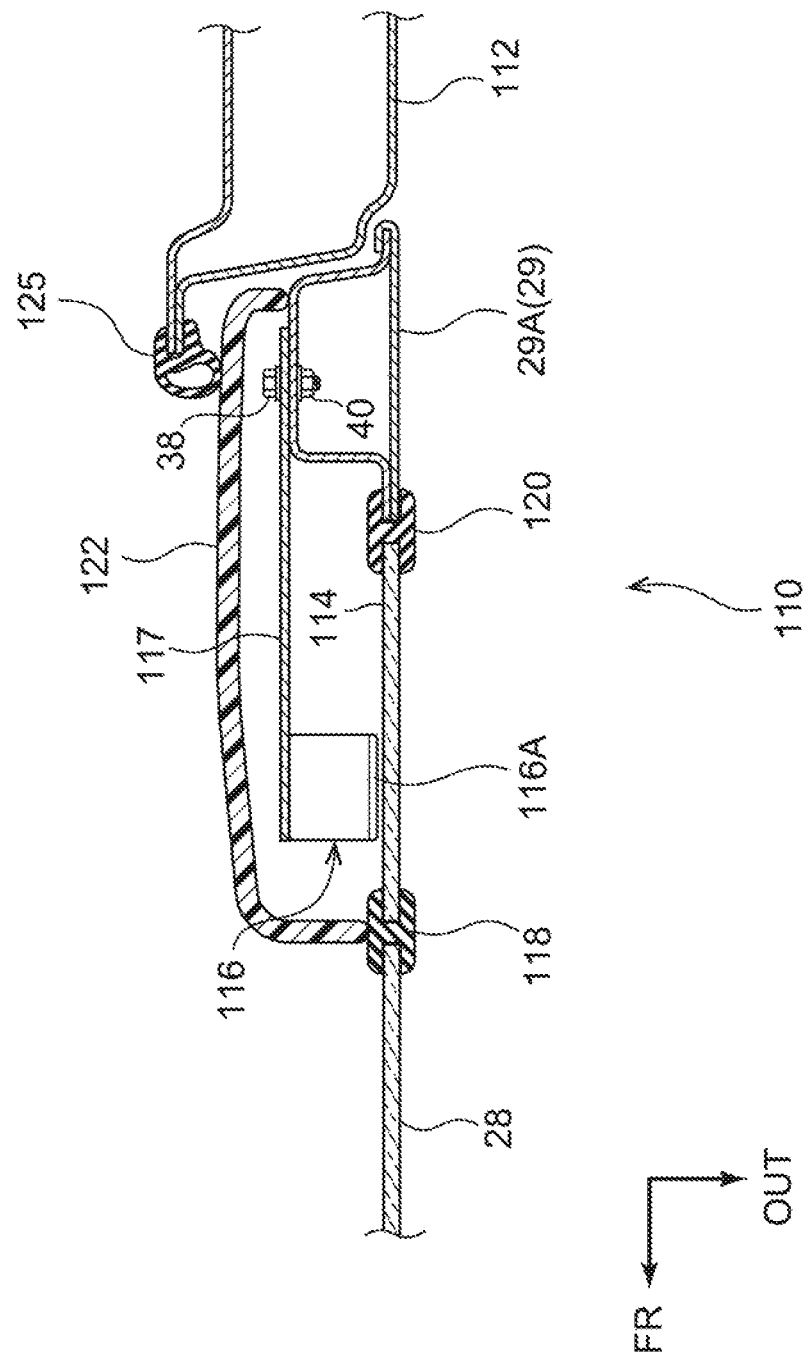

STRUCTURE DISPOSED WITH PERIPHERAL INFORMATION DETECTION SENSOR, AND SELF-DRIVING VEHICLE

CROSS-REFERENCE TO RELATED APPLICATION

This application claims priority under 35 USC 119 from Japanese Patent Application No. 2015-068562 filed on Mar. 30, 2015, the disclosure of which is incorporated by reference herein.

BACKGROUND

Technical Field

The present invention relates to a structure disposed with a peripheral information detection sensor and to a self-driving vehicle.

Related Art

U.S. Patent Application Publication No. 2010/0020306 discloses a structure where a LIDAR system (a peripheral information detection sensor) equipped with a photon detector (a detection component) for detecting peripheral information relating to the area around a vehicle is placed on the roof of the vehicle. In addition to this, structures where an optical camera or the like is placed on the vehicle inner side of a front glass are known.

SUMMARY OF THE INVENTION

However, placing the peripheral information detection sensor on the roof has the potential to impair the outer appearance of the vehicle. On the other hand, placing the peripheral information detection sensor inside the cabin has the potential to degrade the visual quality of the cabin interior. For this reason, from the standpoint of ensuring the attractiveness of the design of the vehicle including the outer appearance of the vehicle and the visual quality of the cabin interior, there is room for improvement.

In consideration of the circumstances described above, it is an object of the present invention to obtain a structure disposed with a peripheral information detection sensor, and a self-driving vehicle, that can ensure the attractiveness of the design of the vehicle.

A structure disposed with a peripheral information detection sensor of a first aspect includes: a peripheral information detection sensor that is disposed at a window frame portion of a side surface of a vehicle and that is equipped with a detection component that detects peripheral information relating to an area around the vehicle; a window member that is attached to the window frame portion and covers the peripheral information detection sensor from an exterior of the vehicle, with at least part of a section of the window member that opposes the peripheral information detection sensor being opaque or translucent; and an interior member that covers the peripheral information detection sensor from a vehicle interior side.

In the structure disposed with a peripheral information detection sensor of the first aspect, the peripheral information detection sensor is disposed at the window frame portion of the side surface of the vehicle. The peripheral information detection sensor is equipped with the detection component that detects the peripheral information relating to the area around the vehicle. Furthermore, the window member is disposed in the window frame portion, and the peripheral information detection sensor is covered from the exterior of the vehicle by the window member. Moreover, at least part of the section of the window member that opposes the peripheral information detection sensor is opaque or translucent. Because of this, the peripheral information detection sensor can be made unable to be seen or difficult to be seen from the outside of the vehicle. That is, the outer appearance of the vehicle can be kept from being impaired.

Furthermore, the peripheral information detection sensor is covered from the vehicle interior side by the interior member. Because of this, the peripheral information detection sensor is not exposed to the vehicle interior side, so the visual quality of the cabin interior can be kept from being degraded.

A structure disposed with a peripheral information detection sensor of a second aspect is the first aspect, wherein the window member is fixed to the window frame portion.

In the structure disposed with a peripheral information detection sensor of the second aspect, by making the window member a fixed window, the peripheral information detection sensor can be kept from being exposed to the outside of the vehicle. That is, in a case where the window member is a window that can be raised and lowered, there is the potential for the peripheral information detection sensor to be exposed to the outside of the vehicle when the window member is lowered. In contrast to this, by making the window member a fixed member, the peripheral information detection sensor is not exposed to the outside of the vehicle and the outer appearance of the vehicle can be well maintained.

A structure disposed with a peripheral information detection sensor of a third aspect is the first aspect or the second aspect, wherein the section of the window member that opposes the detection component is transparent, and the section of the window member that opposes the peripheral information detection sensor, excluding the section that opposes the detection component, is opaque or translucent.

In the structure disposed with a peripheral information detection sensor of the third aspect, by making opaque or translucent the section of the window member that opposes the peripheral information detection sensor excluding the section that opposes the detection component, it can be ensured that the peripheral information detection sensor is not conspicuous from the outside of the vehicle. Furthermore, the section of the window member that opposes the detection component is transparent, so in a case where the peripheral information detection sensor is configured by an optical system such as an optical camera, for example, the precision with which the peripheral information detection sensor detects the peripheral information can be well maintained.

A structure disposed with a peripheral information detection sensor of a fourth aspect is any one of the first aspect to the third aspect, wherein the interior member is formed by an electrically conductive member.

In the structure disposed with a peripheral information detection sensor of the fourth aspect, electromagnetic waves generated inside the cabin can be blocked by the interior member and the effect of electromagnetic noise on the peripheral information detection sensor can be controlled.

A self-driving vehicle of a fifth aspect includes: the structure disposed with a peripheral information detection sensor according to any one of the first aspect to the fourth aspect; and a control component that controls driving of the vehicle based on peripheral information detected by the peripheral information detection sensor.

In the self-driving vehicle of the fifth aspect, the self-driving vehicle drives itself as a result of the control component controlling the driving of the vehicle on the basis of the peripheral information relating to the area around the vehicle. Furthermore, the vehicle becomes less susceptible to air resistance during travel compared to a configuration where the peripheral information detection sensor is placed on the roof of the vehicle. Because of this, fuel economy is improved and the self-driving distance can be increased.

As described above, according to the structure disposed with a peripheral information detection sensor of the first aspect, the structure has the superior effect that it can ensure design attractiveness including the outer appearance of the vehicle and the visual quality of the cabin interior.

According to the structure disposed with a peripheral information detection sensor of the second aspect, the structure has the superior effect that it can well maintain the outer appearance of the vehicle compared to the case of using a window member that can be raised and lowered.

According to the structure disposed with a peripheral information detection sensor of the third aspect, the structure has the superior effect that, even in the case of using an optical system peripheral information detection sensor, it can well maintain the precision with which the peripheral information detection sensor detects the peripheral information.

According to the structure disposed with a peripheral information detection sensor of the fourth aspect, the structure has the superior effect that it can well maintain the detection precision of the peripheral information detection sensor.

According to the self-driving vehicle of the fifth aspect, the attractiveness of the design of the vehicle can be ensured and the self-driving distance can be increased.

BRIEF DESCRIPTION OF THE DRAWINGS

Embodiments of the present invention will be described in detail based on the following figures, wherein:

FIG. 15 is an enlarged sectional view showing a state in which the vehicle of the sixth embodiment is cut along line 15-15 of FIG. 14.

DETAILED DESCRIPTION OF THE INVENTION

First Embodiment

Figure 1:
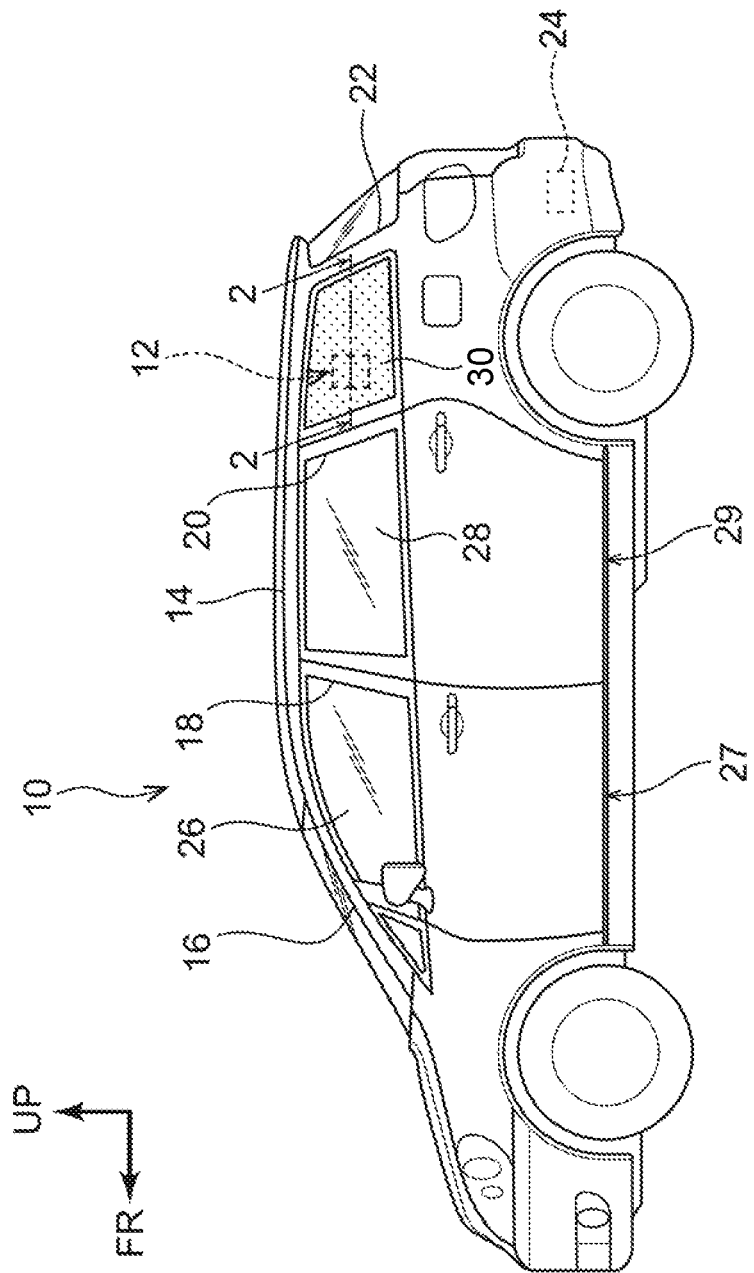
FIG. 1 is a side view of a vehicle in which a peripheral information detection sensor pertaining to a first embodiment is installed.

A self-driving vehicle 10 (hereinafter simply called "the vehicle 10") to which a structure disposed with a peripheral information detection sensor 12 pertaining to a first embodiment of the present invention has been applied will be described below using FIG. 1 and FIG. 2. It should be noted that arrow FR appropriately shown in the drawings indicates a vehicle front side of the vehicle 10 in which the peripheral information detection sensor 12 is installed, arrow UP indicates a vehicle upper side, and arrow OUT indicates an outward direction in a vehicle width direction. Furthermore, when the directions of front and rear, up and down, and right and left are used without further specification in the following description, these will be understood to mean front and rear in the vehicle front and rear direction, up and down in the vehicle up and down direction, and right and left in a case where one faces the direction of forward travel.

As shown in FIG. 1, in the vehicle upper portion of the vehicle 10, a roof side rail 14 is disposed in the vehicle front and rear direction. Furthermore, a front pillar (an A-pillar) 16 extends from the front end portion of the roof side rail 14 toward the vehicle lower side. On the vehicle rear side of the front pillar 16, a center pillar (a B-pillar) 18 extends from the roof side rail 14 toward the vehicle lower side. Furthermore, on the vehicle rear side of the center pillar 18, a first quarter pillar (a C-pillar) 20 serving as a window frame portion extends from the roof side rail 14 toward the vehicle lower side. Moreover, on the vehicle rear side of the first quarter pillar 20, a second quarter pillar (a D-pillar) 22 extends from the roof side rail 14 toward the vehicle lower side.

A front door glass 26 is disposed between the front pillar 16 and the center pillar 18. Furthermore, the front door glass 26 is attached to a front side door 27 in such a way that the front door glass 26 can be raised and lowered. Additionally, the front door glass 26 is configured in such a way that it is raised and lowered by operating a non-illustrated power window switch inside the cabin. Furthermore, a rear door glass 28 is disposed between the center pillar 18 and the first quarter pillar 20. Like the front door glass 26, the rear door glass 28 is configured in such a way that it can be raised and lowered in a rear side door 29. Moreover, a rear quarter glass 30 serving as a window member is disposed between the first quarter pillar 20 and the second quarter pillar 22. Additionally, the peripheral information detection sensor 12 is placed on the cabin interior side of the rear quarter glass 30.

Here, the vehicle 10 is disposed with a controller 24 serving as a control component that controls the driving of the vehicle 10 on the basis of peripheral information detected by the peripheral information detection sensor 12. Furthermore, the peripheral information detection sensor 12 and the controller 24 are electrically connected to each other. For this reason, the vehicle 10 is configured in such a way that it can be driven by the controller 24 without having to be driven by a driver. It should be noted that in the present embodiment the vehicle 10 is configured in such a way that it can be switched between a self-driving mode, in which the controller 24 controls the driving of the vehicle 10 on the basis of the peripheral information detected by the peripheral information detection sensor 12, and a manual driving mode, in which a driver operates a non-illustrated steering wheel to drive the vehicle 10. Furthermore, the position of the controller 24 is not limited to the position shown in FIG. 1 and may also be appropriately changed depending, for example, on the position where the peripheral information detection sensor 12 is installed.

(Structure Disposed with Peripheral Information Detection Sensor)

Figure 2:
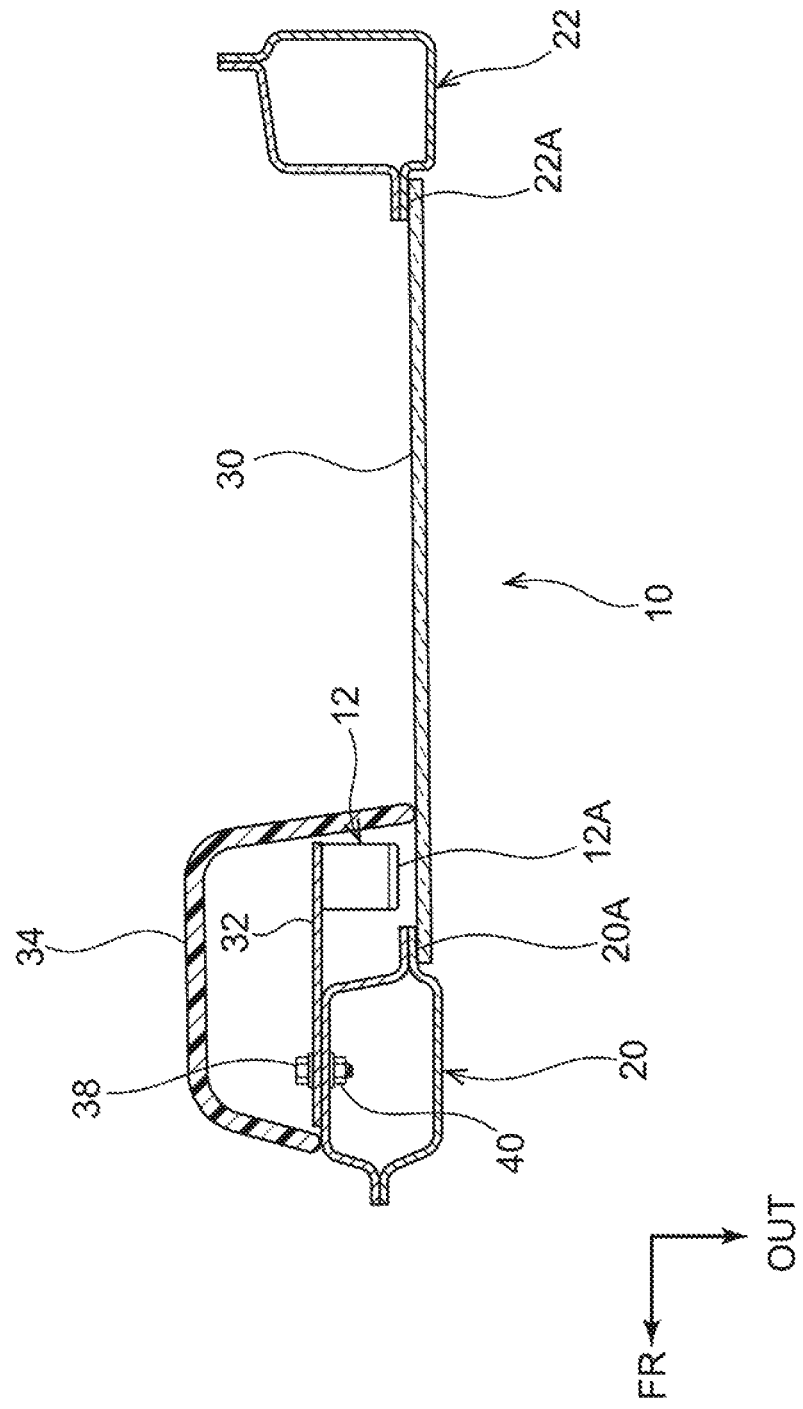
FIG. 2 is an enlarged sectional view showing a state in which the vehicle of the first embodiment is cut along line 2-2 of FIG. 1.

As shown in FIG. 2, the peripheral information detection sensor 12 is attached by means of a bracket 32 to the first quarter pillar 20. Specifically, the first quarter pillar 20 is configured by two cross-sectionally substantially hat-shaped panels that are put together to give the first quarter pillar 20 a closed cross-sectional structure having a cross-sectionally substantially rectangular shape. Additionally, the bracket 32 is fastened by a bolt 38 and a nut 40 to the vehicle inner side of the first quarter pillar 20. The bracket 32 extends from the first quarter pillar 20 toward the vehicle rear side, and the peripheral information detection sensor 12 is attached to the rear end portion of the bracket 32.

Here, the peripheral information detection sensor 12 is equipped with a detection component 12A that detects peripheral information relating to the area around the vehicle 10. The detection component 12A faces outward in the vehicle width direction. It should be noted that in the present embodiment, as an example, a millimeter-wave radar is used as the peripheral information detection sensor 12, so that the radio wave transmitting component and the radio wave receiving component constitute the detection component 12A. However, the peripheral information detection sensor 12 is not limited to this. For example, a sensor that emits and receives laser light, such as a laser radar, may also be used. Furthermore, a sensor equipped with an optical system, such as an optical camera, may also be used, and other sensors may also be used. Additionally, in the case of using a laser radar as the peripheral information detection sensor 12, the laser light emitting component and the laser light receiving component constitute the detection component 12A. Furthermore, in the case of using an optical camera as the peripheral information detection sensor 12, the visible light receiving component constitutes the detection component 12A. The same is also true of the peripheral information detection sensors pertaining to the second embodiment to the sixth embodiment.

The rear quarter glass 30 is placed on the vehicle width direction outside of the peripheral information detection sensor 12, so that the peripheral information detection sensor 12 is covered from the outside of the vehicle 10 by the rear quarter glass 30. Furthermore, the rear quarter glass 30 of the present embodiment is a fixed window fixed between the first quarter pillar 20 and the second quarter pillar 22. Specifically, the front end portion of the rear quarter glass 30 is fixed to a flange portion 20A formed on the rear end side of the first quarter pillar 20. Furthermore, the rear end portion of the rear quarter glass 30 is fixed to a flange portion 22A formed in the front end portion of the second quarter pillar 22.

Here, the rear quarter glass 30 is configured by colored glass, and the entire surface of the rear quarter glass 30 is opaque or translucent. It should be noted that, in the case of using a laser radar or an optical camera as the peripheral information detection sensor 12, the rear quarter glass 30 is made translucent so that laser light and visible light can pass through it. Furthermore, in the case of using a sensor that detects radio waves—such as a millimeter-wave radar—as the peripheral information detection sensor 12 like in the present embodiment, opaque colored glass that allows radio waves to pass through it may also be used to configure the rear quarter glass 30.

Furthermore, a trim 34 serving as an interior member is disposed on the cabin interior side of the first quarter pillar 20. The trim 34 is formed in a cross-sectionally substantially U-shape that opens outward in the vehicle width direction. In the present embodiment, the trim 34 is formed of a resin material. Additionally, the peripheral information detection sensor 12 is covered from the cabin interior side by the trim 34. It should be noted that although it is preferred that the trim 34 be formed by an electrically conductive member so that it can block electromagnetic waves generated inside the cabin, the trim 34 is not limited to this and may also be formed by a member that is not electrically conductive. Furthermore, a metal film or the like may also be adhered to the trim 34.

(Action and Effects)

Next, the action and effects of the vehicle 10 equipped with the peripheral information detection sensor 12 pertaining to the present embodiment will be described. In the present embodiment, as shown in FIG. 1, the peripheral information detection sensor 12 is disposed on the cabin interior side of the rear quarter glass 30. Additionally, the vehicle 10 can be driven on the basis of the peripheral information detected by the peripheral information detection sensor 12. Specifically, as shown in FIG. 2, the detection component 12A is disposed in the peripheral information detection sensor 12, and the peripheral information relating to the area around the vehicle 10 is detected by the detection component 12. Additionally, the peripheral information is transmitted from the peripheral information detection sensor 12 to the controller 24. In this way, the controller 24 controls the driving of the vehicle 10 on the basis of the peripheral information acquired from the peripheral information detection sensor 12.

Here, in the present embodiment, the peripheral information detection sensor 12 is covered from the outside of the vehicle 10 by the rear quarter glass 30. Furthermore, the rear quarter glass 30 is colored, and its entire surface is opaque or translucent. In this way, by making opaque or translucent the section of the rear quarter glass 30 that opposes the peripheral information detection sensor 12, the peripheral information detection sensor 12 can be made unable to be seen or difficult to be seen from the outside of the vehicle 10.

Furthermore, the peripheral information detection sensor 12 is covered from the cabin interior side by the trim 34. Because of this, the peripheral information detection sensor 12 is not exposed to the cabin interior side and can be unable to be seen or difficult to be seen by the vehicle occupant.

That is, the visual quality of the cabin interior can be kept from being degraded, and the attractiveness of the design of the vehicle can be ensured.

Moreover, in a case where the trim 34 is formed by an electrically conductive member, electromagnetic waves generated inside the cabin can be blocked by the trim 34. Because of this, the effect of electromagnetic noise on the peripheral information detection sensor 12 can be controlled. As a result, the detection precision of the peripheral information detection sensor 12 can be well maintained.

Furthermore, the rear quarter glass 30 pertaining to the present embodiment is a fixed window fixed between the first quarter pillar 20 and the second quarter pillar 22. In this way, by employing a structure where the rear quarter glass 30 does not go up and down, the peripheral information detection sensor 12 can be kept from being exposed to the outside of the vehicle 10. That is, in a case where the peripheral information detection sensor 12 is placed on the cabin interior side of a window member that can be raised and lowered, there is the potential for the peripheral information detection sensor 12 to be exposed to the outside of the vehicle when the window member is lowered. In contrast to this, by making the rear quarter glass 30 a fixed window like in the present embodiment, the outer appearance of the vehicle can be well maintained.

Moreover, by placing the peripheral information detection sensor 12 inside the vehicle 10 pertaining to the present embodiment, the vehicle 10 becomes less susceptible to air resistance during travel compared to a configuration where the peripheral information detection sensor is placed on the roof. Because of this, fuel economy is improved and the self-driving distance of the vehicle 10 can be increased. That is, the attractiveness of the design of the vehicle 10 can be ensured and the self-driving distance can be increased.

Second Embodiment

Next, a self-driving vehicle 50 (hereinafter simply called "the vehicle 50") to which a structure disposed with a peripheral information detection sensor 52 pertaining to a second embodiment of the present invention has been applied will be described with reference to FIG. 3 and FIG. 4. It should be noted that the same reference signs are assigned to configurations that are the same as those in the first embodiment and description of those same configurations will be omitted.

Figure 3:
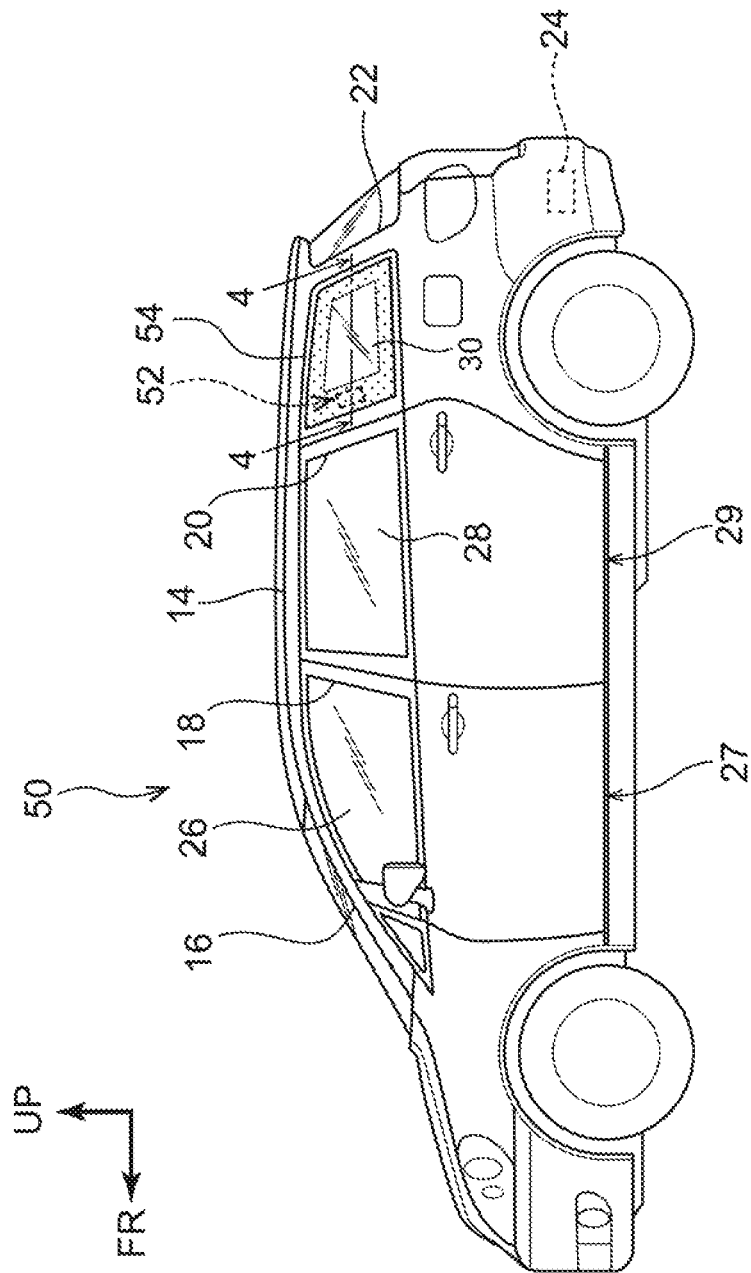
FIG. 3 is a side view of a vehicle in which a peripheral information detection sensor pertaining to a second embodiment is installed.

As shown in FIG. 3, the peripheral information detection sensor 52 pertaining to the present embodiment is placed on the cabin interior side of the rear quarter glass 30 serving as a window member disposed between the first quarter pillar 20 and the second quarter pillar 22.

Figure 4:
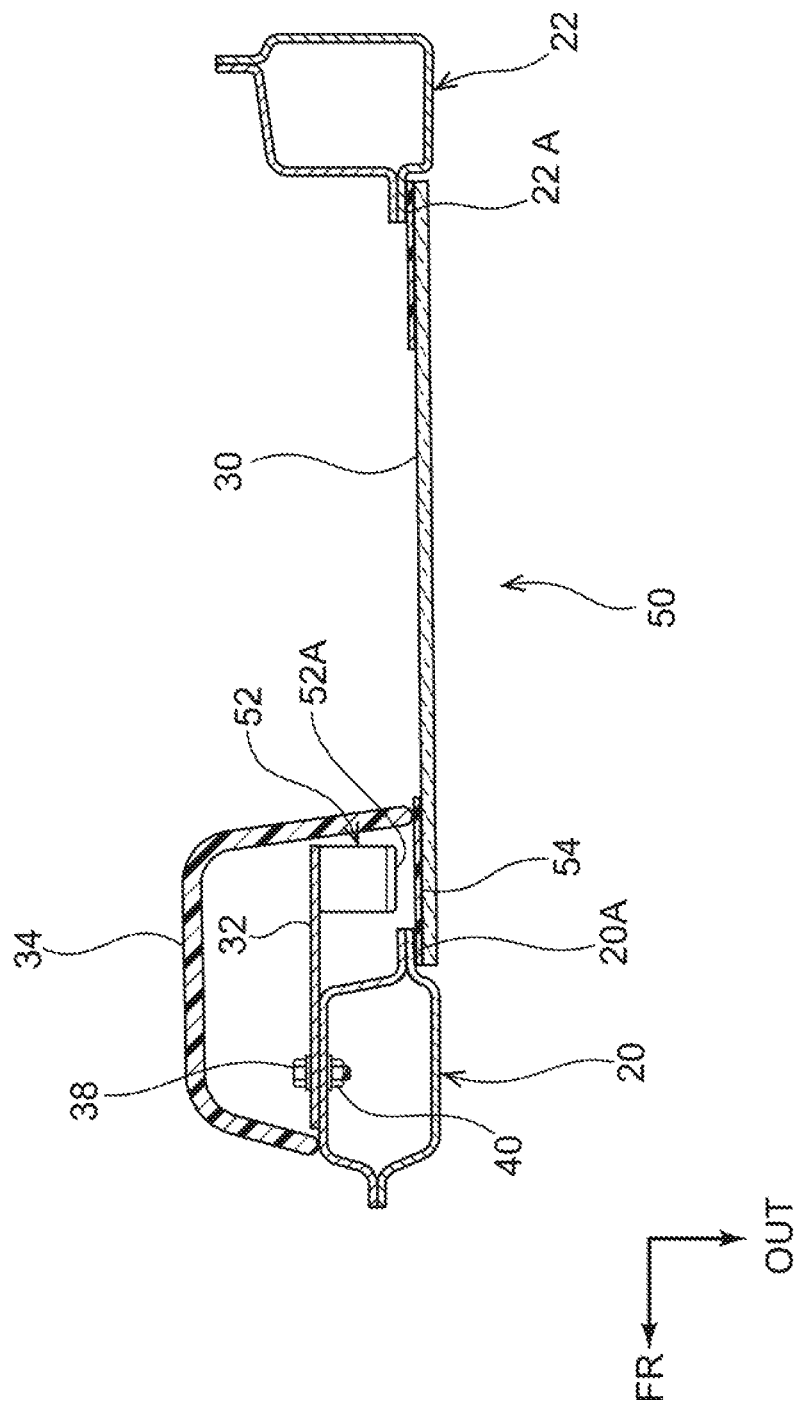
FIG. 4 is an enlarged sectional view showing a state in which the vehicle of the second embodiment is cut along line 4-4 of FIG. 3.

As shown in FIG. 4, the peripheral information detection sensor 52 is attached by means of the bracket 32 to the first quarter pillar 20. Furthermore, the peripheral information detection sensor 52 is equipped with a detection component 52A that detects peripheral information relating to the area around the vehicle 50. The detection component 52A faces outward in the vehicle width direction.

Here, a ceramic processed portion (a black-painted processed portion) 54 is disposed on the outer peripheral portion of the rear quarter glass 30 placed on the vehicle width direction outside of the peripheral information detection sensor 52. For this reason, only the outer peripheral section of the rear quarter glass 30 is opaque. Additionally, the peripheral information detection sensor 52 is placed on the cabin interior side of the ceramic processed portion 54 of the rear quarter glass 30.

(Action and Effects)

Next, the action and effects of the vehicle 50 equipped with the peripheral information detection sensor 52 pertaining to the present embodiment will be described. In the present embodiment, the central section of the rear quarter glass 30 is transparent, so the cabin interior side can be seen from the outside the vehicle 50 through the rear quarter glass 30. Furthermore, the outer peripheral portion of the rear quarter glass 30 has the ceramic processed portion 54 disposed on it and is opaque, and the peripheral information detection sensor 52 is placed on the cabin interior side of the outer peripheral portion of the rear quarter glass 30. Because of this, the peripheral information detection sensor 52 can be made unable to be seen from the outside of the vehicle 50. Moreover, an adhesive (not shown in the drawings) between the first quarter pillar 20 and the rear quarter glass 30 and an adhesive (not shown in the drawings) between the second quarter pillar 22 and the rear quarter glass 30 can also be made unable to be seen from the outside of the vehicle 50. Other effects are the same as those of the first embodiment.

It should be noted that, although in the present embodiment the outer peripheral portion of the rear quarter glass 30 is made opaque as a result of the ceramic processed portion 54 being disposed thereon, the present invention is not limited to this.

Furthermore, in the present embodiment, the peripheral information detection sensor 52 is completely covered from the outside of the vehicle 50 by the ceramic processed portion 54, but the present invention is not limited to this. For example, the ceramic processed portion 54 may also be configured like in the example modification shown in FIG. 5, in which the section of the ceramic processed portion 54 that opposes the detection component 52A is transparent.

Figure 5:
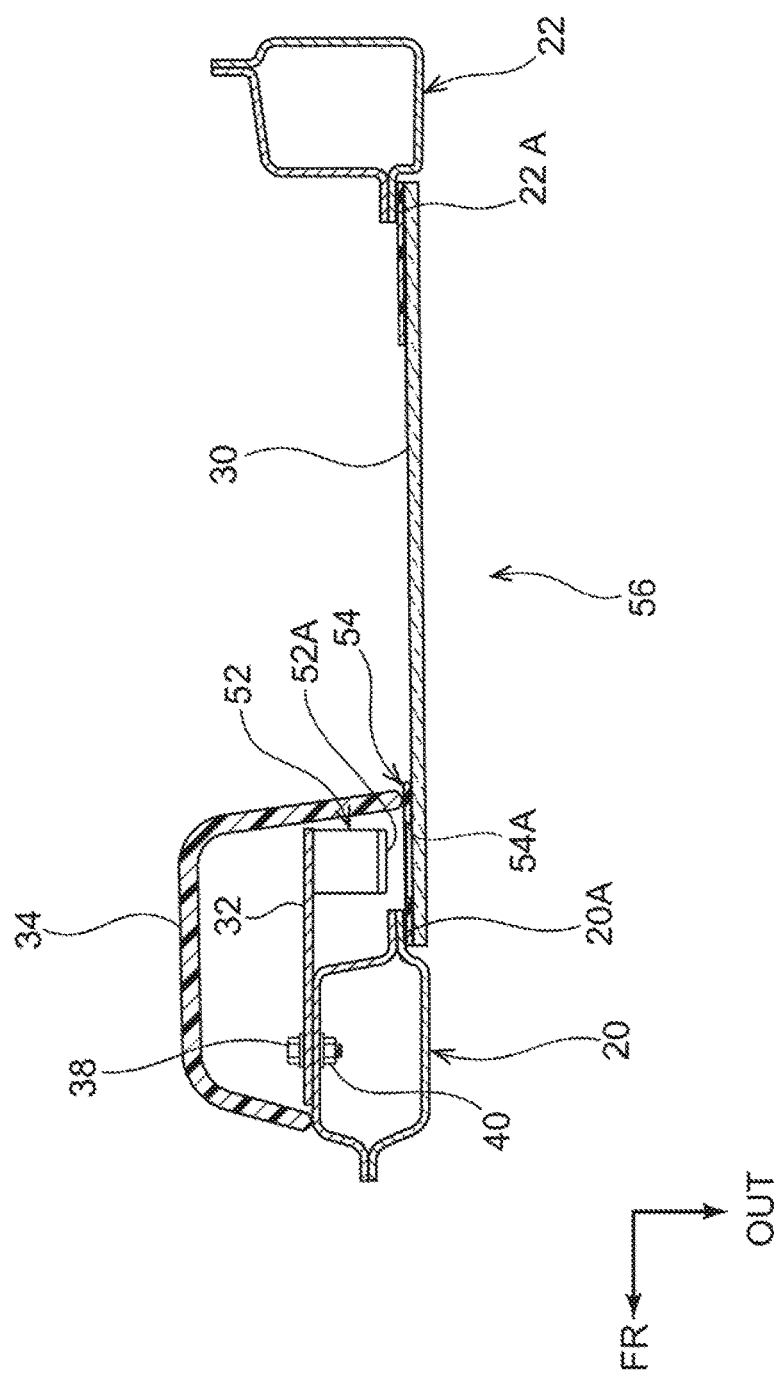
FIG. 5 is a sectional view, corresponding to FIG. 4, showing an example modification of the vehicle in which the peripheral information detection sensor pertaining to the second embodiment is installed.

As shown in FIG. 5, in a vehicle 56 of this example modification, the opaque ceramic processed portion 54 is disposed on the outer peripheral portion of the rear quarter glass 30. Here, an open portion 54A is formed in the ceramic processed portion 54. The open portion 54A is formed in the section of the ceramic processed portion 54 that opposes the detection component 52A of the peripheral information detection sensor 52. Ceramic processing is not performed on the open portion 54A. For this reason, the section of the rear quarter glass 30 that opposes the detection component 52A is transparent, so excluding the detection component 52A the peripheral information detection sensor 52 is unable to be seen from the outside of the vehicle 56.

In this example modification, as described above, by making opaque the outer peripheral portion of the rear quarter glass 30 excluding the section that opposes the detection component 52A, it can be ensured that the peripheral information detection sensor 52 is not conspicuous from the outside of the vehicle 56. Furthermore, the section of the rear quarter glass 30 that opposes the detection component 52A is transparent because the open portion 54A is formed there. Because of this, even in a case where the peripheral information detection sensor 52 is configured by a laser radar or an optical system such as an optical camera, the peripheral information can be detected.

Third Embodiment

Next, a self-driving vehicle 60 (hereinafter simply called "the vehicle 60") to which a structure disposed with a peripheral information detection sensor 62 pertaining to a third embodiment of the present invention has been applied will be described with reference to FIG. 6 and FIG. 7. It should be noted that the same reference signs are assigned to configurations that are the same as those in the first embodiment and description of those same configurations will be omitted.

Figure 6:
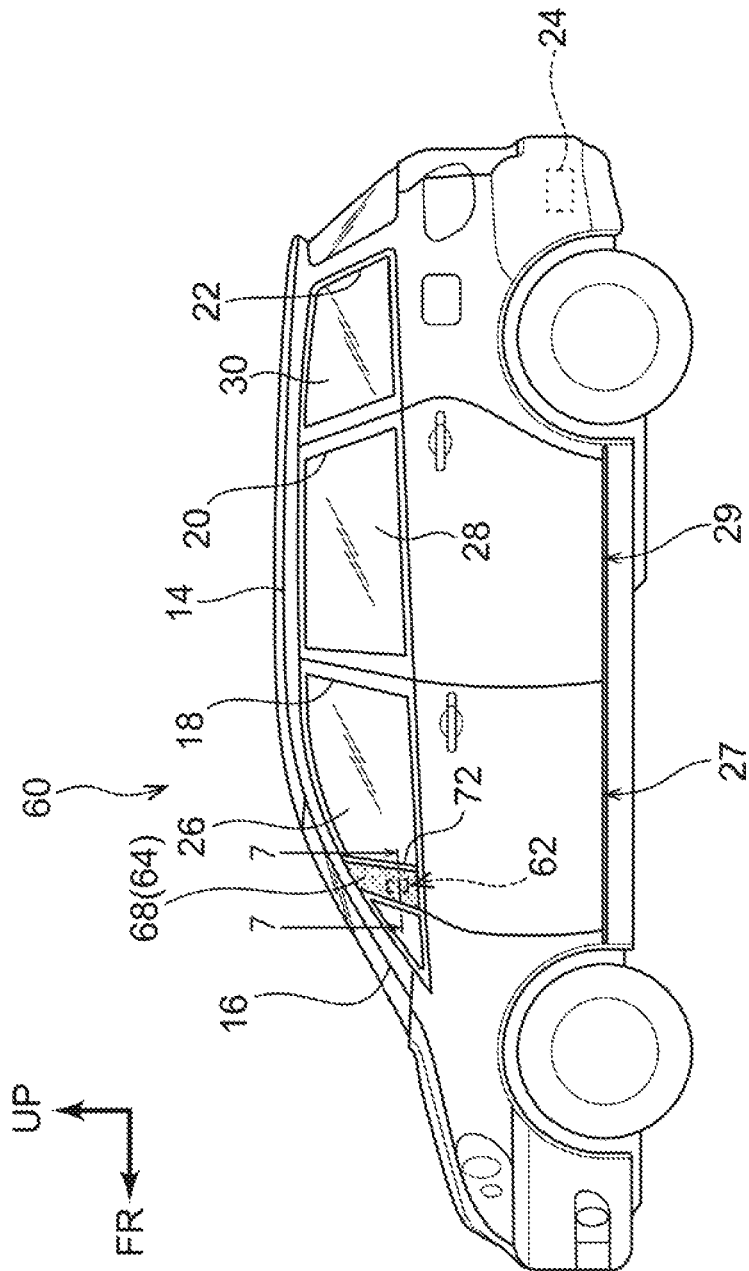
FIG. 6 is a side view of a vehicle in which a peripheral information detection sensor pertaining to a third embodiment is installed.

As shown in FIG. 6, the vehicle 60 pertaining to the present embodiment does not have a door mirror disposed on the front end portion of the front door glass 26; rather, the door mirror is computerized. For this reason, for example, information relating to the area on the side of the vehicle 60 and the area behind the vehicle 60 is configured to be displayed on a non-illustrated instrument panel inside the cabin. The fourth embodiment and the fifth embodiment described below also have the same configuration.

Here, the peripheral information detection sensor 62 pertaining to the present embodiment is placed utilizing the section where the door mirror had been attached. Specifically, a front quarter glass 64 serving as a window member is disposed on the vehicle front side of the front door glass 26, with a weather strip 72 interposed between the front quarter glass 64 and the front door glass 26. The peripheral information detection sensor 62 pertaining to the present embodiment is placed on the cabin interior side of the front quarter glass 64.

Figure 7:
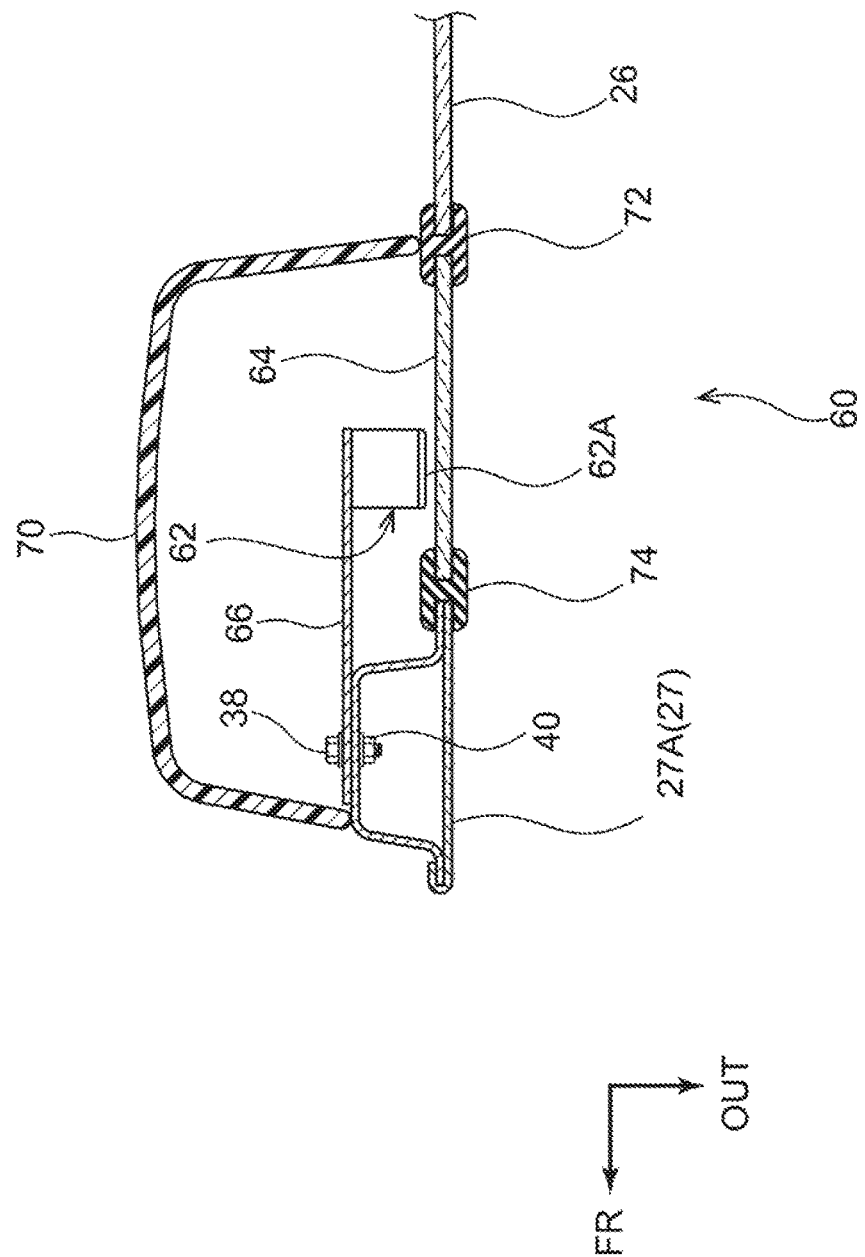
FIG. 7 is an enlarged sectional view showing a state in which the vehicle of the third embodiment is cut along line 7-7 of FIG. 6.

As shown in FIG. 7, the peripheral information detection sensor 62 is attached by means of a bracket 66 to a door sash portion 27A serving as a window frame portion. Specifically, the door sash portion 27A extends from the upper end portion of the front side door 27 toward the vehicle upper side, and the bracket 66 is fastened by the bolt 38 and the nut 40 to the vehicle width direction inside of the door sash portion 27A. Additionally, the bracket 66 extends from the door sash portion 27A toward the vehicle rear side, and the peripheral information detection sensor 62 is attached to the rear end portion of the bracket 66.

Furthermore, the peripheral information detection sensor 62 is equipped with a detection component 62A that detects peripheral information relating to the area around the vehicle 60. The detection component 62A faces outward in the vehicle width direction.

The front quarter glass 64 is placed on the vehicle width direction outside of the peripheral information detection sensor 62, so that the peripheral information detection sensor 62 is covered from the outside of the vehicle 60 by the front quarter glass 64. Furthermore, the front quarter glass 64 is a fixed window fixed between the weather strip 72 and a weather strip 74.

Here, the front quarter glass 64 is configured by colored glass, and the entire surface of the front quarter glass 64 is opaque or translucent.

Furthermore, a trim 70 serving as an interior member is disposed on the cabin interior side of the door sash portion 27A. The trim 70 is formed in a cross-sectionally substantially U-shape that opens outward in the vehicle width direction. In the present embodiment, the trim 70 is formed of a resin material. Additionally, the peripheral information detection sensor 62 is covered from the cabin interior side by the trim 70.

(Action and Effects)

Next, the action and effects of the vehicle 60 equipped with the peripheral information detection sensor 62 pertaining to the present embodiment will be described. In the present embodiment, by making opaque or translucent the front quarter glass 64 that covers the peripheral information detection sensor 62 from the outside of the vehicle 60, the peripheral information detection sensor 62 can be made unable to be seen or difficult to be seen from the outside of the vehicle 60.

Furthermore, by placing the peripheral information detection sensor 62 on the front end portion of the front door glass 26, peripheral information relating to the area on the side of the vehicle 60 on the front end side of the vehicle 60 can be effectively detected. Moreover, because a door mirror is not disposed, the detection range of the peripheral information detection sensor 62 can be kept from being reduced by a door mirror. Other effects are the same as those of the first embodiment.

Fourth Embodiment

Next, a self-driving vehicle 80 (hereinafter simply called "the vehicle 80") to which a structure disposed with a peripheral information detection sensor 82 pertaining to a fourth embodiment of the present invention has been applied will be described with reference to FIG. 8 and FIG. 9. It should be noted that the same reference signs are assigned to configurations that are the same as those in the first embodiment and description of those same configurations will be omitted.

Figure 8:
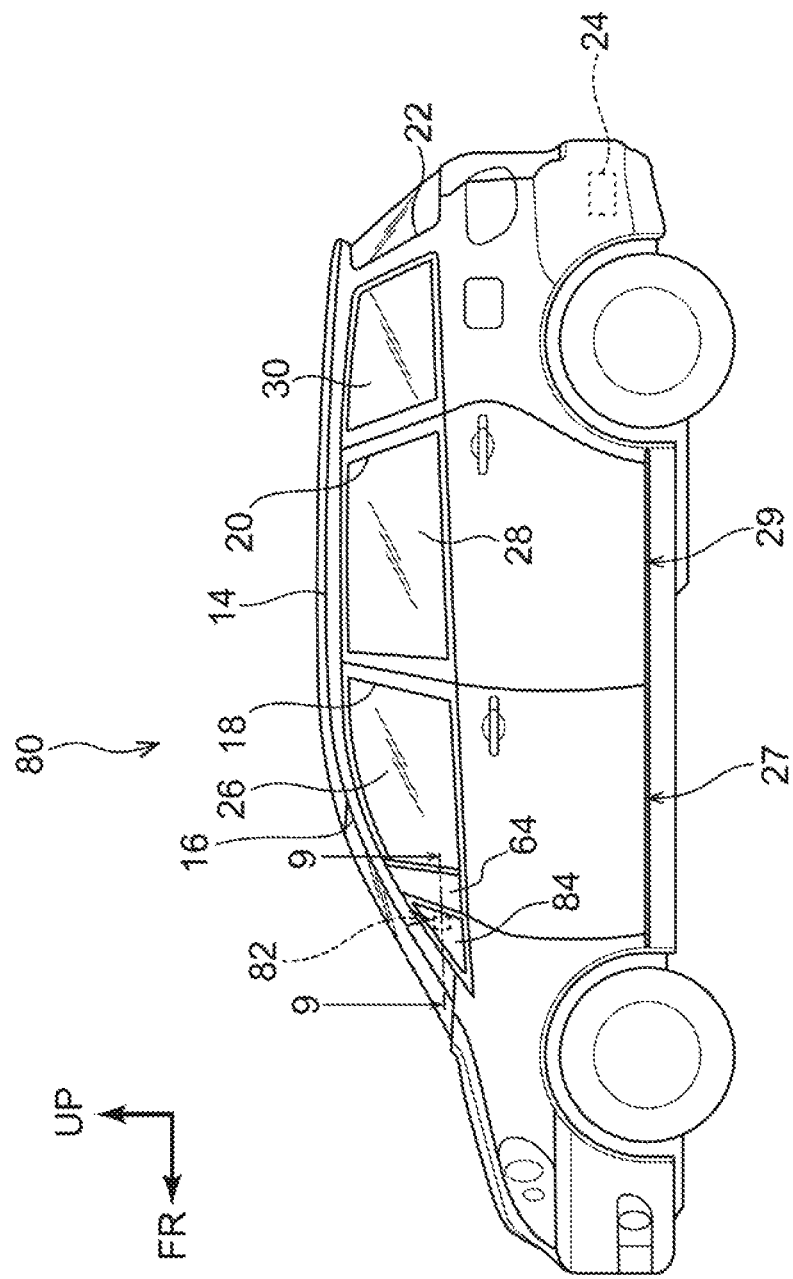
FIG. 8 is a side view of a vehicle in which a peripheral information detection sensor pertaining to a fourth embodiment is installed.

As shown in FIG. 8, the peripheral information detection sensor 82 pertaining to the present embodiment is placed utilizing the section where the door mirror had been attached. Specifically, the peripheral information detection sensor 82 is placed on the vehicle front side of the front door glass 26 of the vehicle 80.

Figure 9:
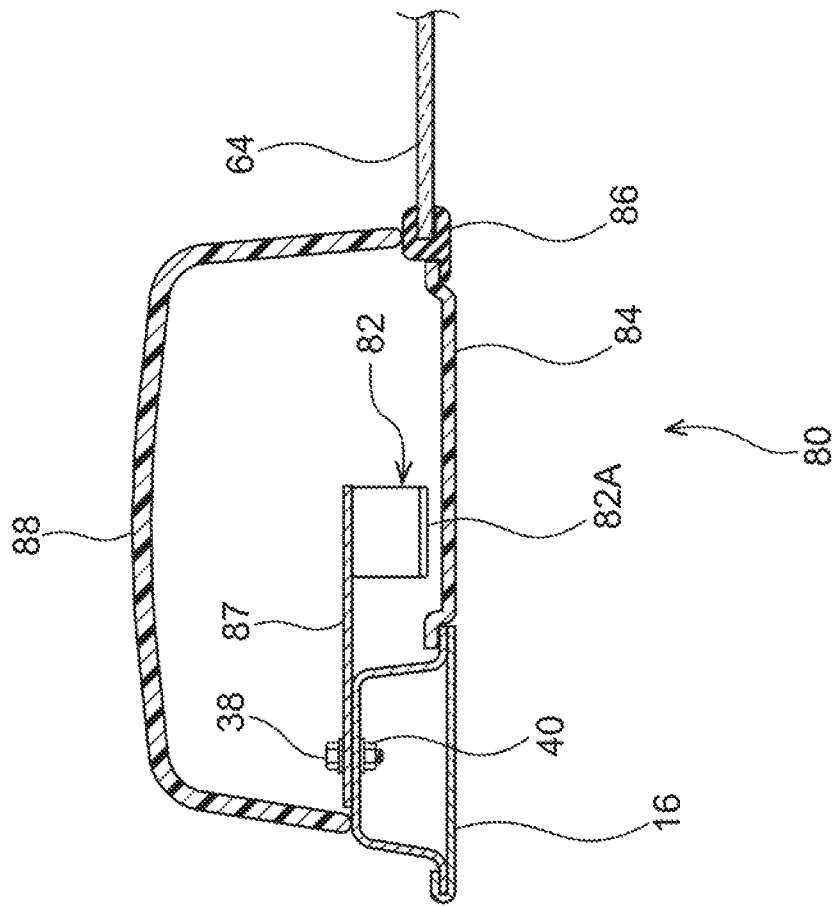
FIG. 9 is an enlarged sectional view showing a state in which the vehicle of the fourth embodiment is cut along line 9-9 of FIG. 8.

As shown in FIG. 9, the front quarter glass 64 is placed on the vehicle front side of the front door glass 26. A resin plate 84 serving as a window member is disposed on the vehicle front side of the front quarter glass 64, with a weather strip 86 interposed between the resin plate 84 and the front quarter glass 64. Additionally, the peripheral information detection sensor 82 pertaining to the present embodiment is placed on the cabin interior side of the resin plate 84.

The peripheral infot nation detection sensor 82 is attached by means of a bracket 87 to the front pillar 16 serving as a window frame portion. Specifically, the bracket 87 is fastened by the bolt 38 and the nut 40 to the vehicle inner side of the front pillar 16. The bracket 87 extends from the front pillar 16 toward the vehicle rear side. Additionally, the peripheral information detection sensor 82 is attached to the rear end portion of the bracket 87.

The peripheral information detection sensor 82 is equipped with a detection component 82A that detects peripheral information relating to the area around the vehicle 80. The detection component 82A faces outward in the vehicle width direction. Moreover, the peripheral information detection sensor 82 is covered from the outside of the vehicle 80 by the resin plate 84. Here, the resin plate 84 is a fixed window fixed between the front pillar 16 and the weather strip 86. Furthermore, the resin plate 84 is formed so as to be opaque or translucent.

A trim 88 serving as an interior member is disposed on the cabin interior side of the front pillar 16. The trim 88 is formed in a cross-sectionally substantially U-shape that opens outward in the vehicle width direction. In the present embodiment, the trim 88 is formed of a resin material. Additionally, the peripheral information detection sensor 82 is covered from the cabin interior side by the trim 88.

(Action and Effects)

Next, the action and effects of the vehicle 80 equipped with the peripheral information detection sensor 82 pertaining to the present embodiment will be described. In the present embodiment, the peripheral information detection sensor 82 is covered from the outside of the vehicle 80 by the resin plate 84 whose formability is higher than that of glass. Because of this, even in a case where the length of the space between the front pillar 16 and the weather strip 86 is short and a glass cannot be placed therein, by placing the resin plate 84 therein the peripheral information detection sensor 82 can be made unable to be seen or difficult to be seen from the outside of the vehicle 80. Other effects are the same as those of the first embodiment.

Figure 10:
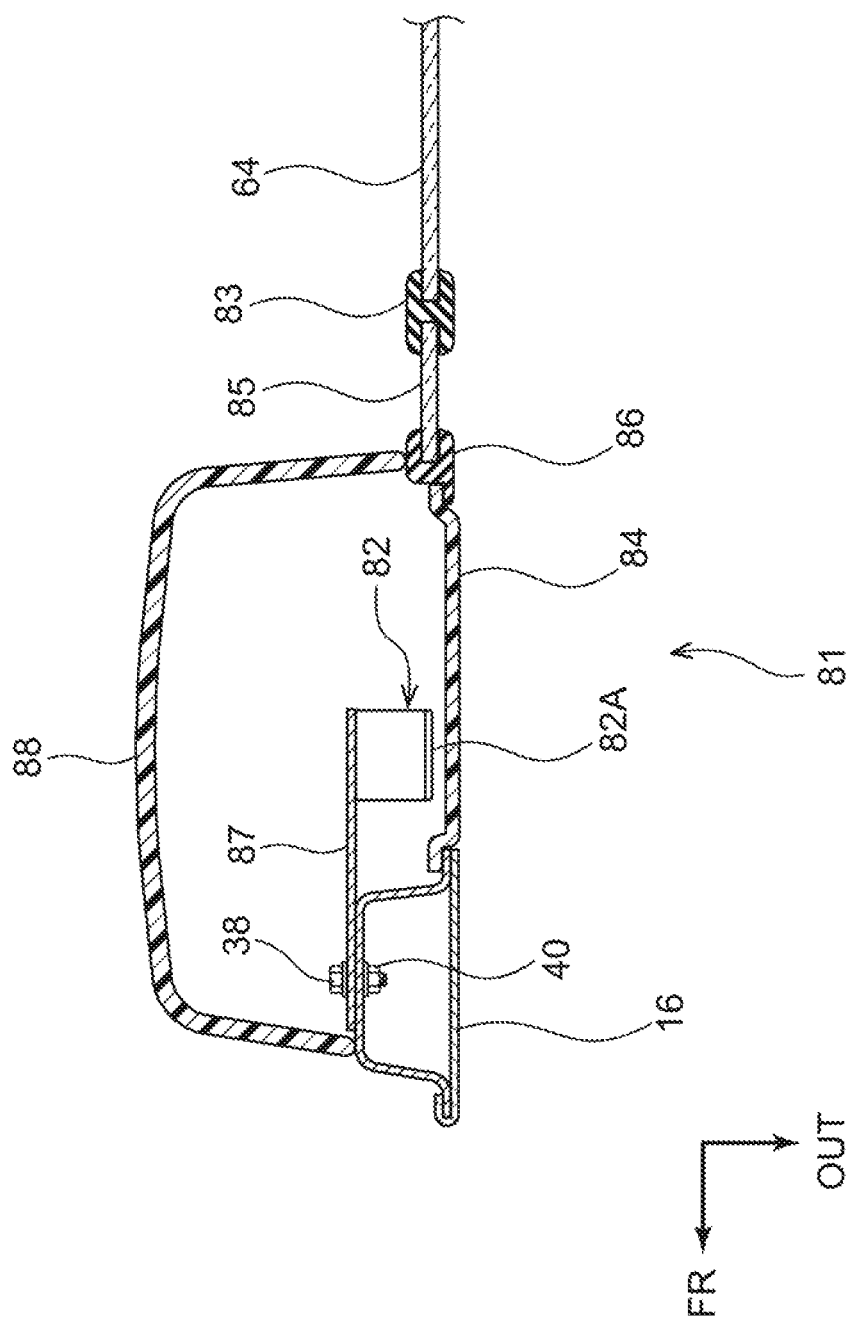
FIG. 10 is a sectional view, corresponding to FIG. 9, showing an example modification of the vehicle in which the peripheral information detection sensor pertaining to the fourth embodiment is installed.

It should be noted that the structure shown in FIG. 10 may also be employed as an example modification of the structure disposed with the peripheral information detection sensor 82 pertaining to the present embodiment. A vehicle 81 pertaining to this example modification has a structure where a glass plate 85 is placed between the front quarter glass 64 and the resin plate 84. Specifically, the glass plate 85 is placed on the vehicle front side of the front quarter glass 64, with a weather strip 83 interposed between the glass plate 85 and the front quarter glass 64. Furthermore, the resin plate 84 is placed on the vehicle front side of the glass plate 85, with the weather strip 86 interposed between the resin plate 84 and the glass plate 85. The structure pertaining to the example modification also has the same effects as those of the present embodiment.

Fifth Embodiment

Next, a self-driving vehicle 90 (hereinafter simply called "the vehicle 90") to which a structure disposed with a peripheral information detection sensor 92 pertaining to a fifth embodiment of the present invention has been applied will be described with reference to FIG. 11 and FIG. 12. It should be noted that the same reference signs are assigned to configurations that are the same as those in the first embodiment and description of those same configurations will be omitted.

Figure 11:
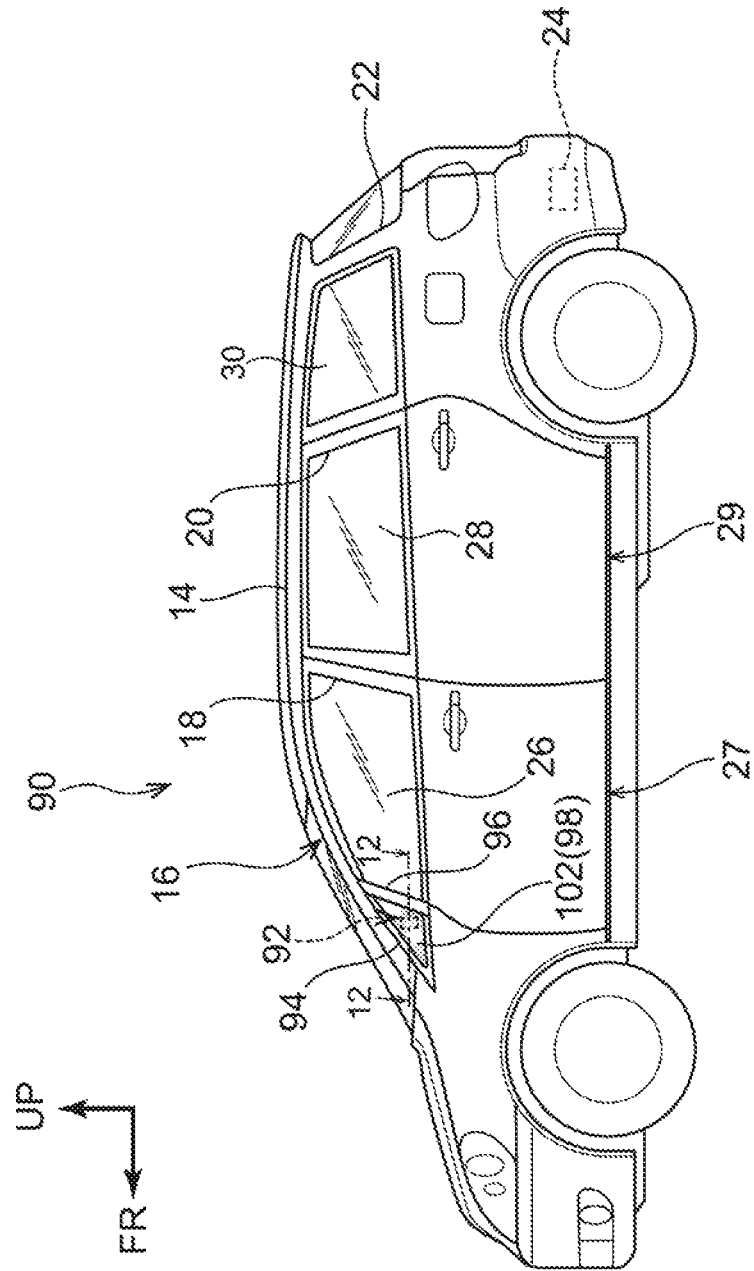
FIG. 11 is a side view of a vehicle in which a peripheral information detection sensor pertaining to a fifth embodiment is installed.

As shown in FIG. 11, the peripheral information detection sensor 92 pertaining to the present embodiment is placed utilizing the section where the door mirror had been attached. Specifically, the peripheral information detection sensor 92 is placed on the vehicle front side of the front door glass 26 of the vehicle 90. Here, in the present embodiment, the front pillar 16 is divided in the middle. For this reason, in the following description, the pillar on the vehicle front side and the pillar on the vehicle rear side into which the front pillar 16 is divided will be called a first A-pillar 94 and a second A-pillar 96, respectively.

Figure 12:
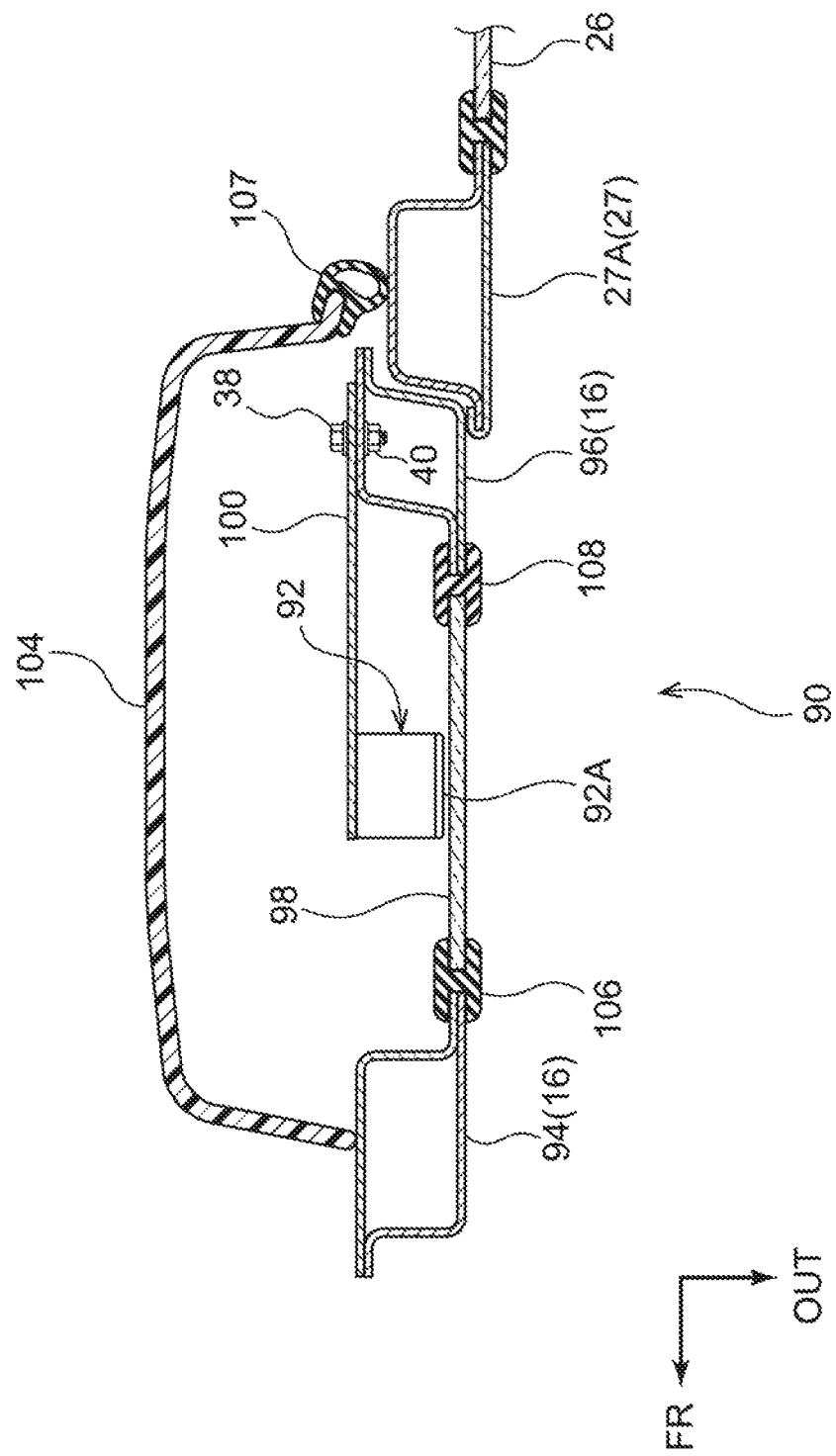
FIG. 12 is an enlarged sectional view showing a state in which the vehicle of the fifth embodiment is cut along line 12-12 of FIG. 11.

As shown in FIG. 12, a front quarter glass 98 serving as a window member is placed on the vehicle front side of the front door glass 26. Additionally, the peripheral information detection sensor 92 pertaining to the present embodiment is placed on the cabin interior side of the front quarter glass 98.

The peripheral information detection sensor 92 is attached by means of a bracket 100 to the second A-pillar 96 serving as a window frame portion. Specifically, the second A-pillar 96 is positioned on the vehicle front side of the door sash portion 27A of the front side door 27 and is formed in a cross-sectionally substantially rectangular shape. Additionally, the bracket 100 is fastened by the bolt 38 and the nut 40 to the vehicle inner side of the second A-pillar 96. The bracket 100 extends from the second A-pillar 96 toward the vehicle front side. Additionally, the peripheral information detection sensor 92 is attached to the front end portion of the bracket 100.

Furthermore, the peripheral information detection sensor 92 is equipped with a detection component 92A that detects peripheral information relating to the area around the vehicle 90. The detection component 92A faces outward in the vehicle width direction. Moreover, the peripheral information detection sensor 92 is covered from the outside of the vehicle 90 by the front quarter glass 98. Here, the front end portion of the front quarter glass 98 is fixed by means of a weather strip 106 to the first A-pillar 94, and the rear end portion of the front quarter glass 98 is fixed by means of a weather strip 108 to the second A-pillar 96. For this reason, the front quarter glass 98 is a fixed window fixed between the first A-pillar 94 and the second A-pillar 96.

Furthermore, the front quarter glass 98 is configured by colored glass, and the entire surface of the front quarter glass 98 is opaque or translucent.

A trim 104 serving as an interior member is disposed on the cabin interior side of the first A-pillar 94 and the second A-pillar 96. The trim 104 is formed in a cross-sectionally substantially U-shape that opens outward in the vehicle width direction. The front end portion of the trim 104 is joined to the first A-pillar 94. Furthermore, the rear end portion of the trim 104 is in contact with the door sash portion 27A by means of a weather strip 107. The peripheral information detection sensor 92 is covered from the cabin interior side by the trim 104 configured as described above.

(Action and Effects)

Next, the action and effects of the vehicle 90 equipped with the peripheral information detection sensor 92 pertaining to the present embodiment will be described. In the present embodiment, by making opaque or translucent the front quarter glass 98 that covers the peripheral information detection sensor 92 from the outside of the vehicle 90, the peripheral information detection sensor 92 can be made unable to be seen or difficult to be seen from the outside of the vehicle 90.

Furthermore, in the present embodiment, the peripheral information detection sensor 92 can be placed utilizing the space between the first A-pillar 94 and the second A-pillar 96 that has a cross-sectionally substantially rectangular shape, so the peripheral information detection sensor 92 does not project inside the cabin and space can be conserved. Other effects are the same as those of the first embodiment.

It should be noted that although in the present embodiment the bracket 100 is fastened to the second A-pillar 96, the configuration of the present embodiment is not limited to this. For example, the bracket 100 may also be fastened to the first A-pillar 94, with the peripheral information detection sensor 92 being attached to the bracket 100. Furthermore, the bracket 100 may also bridge the first A-pillar 94 and the second A-pillar 96. In this case, attachment rigidity can be improved compared to a cantilever structure.

Furthermore, in the present embodiment, the front quarter glass 98 fixed between the first A-pillar 94 and the second A-pillar 96 is made opaque or translucent as a result of being configured by colored glass, but the configuration of the present embodiment is not limited to this. For example, a resin plate 109 may also be disposed like in the example modification shown in FIG. 13.

Figure 13:
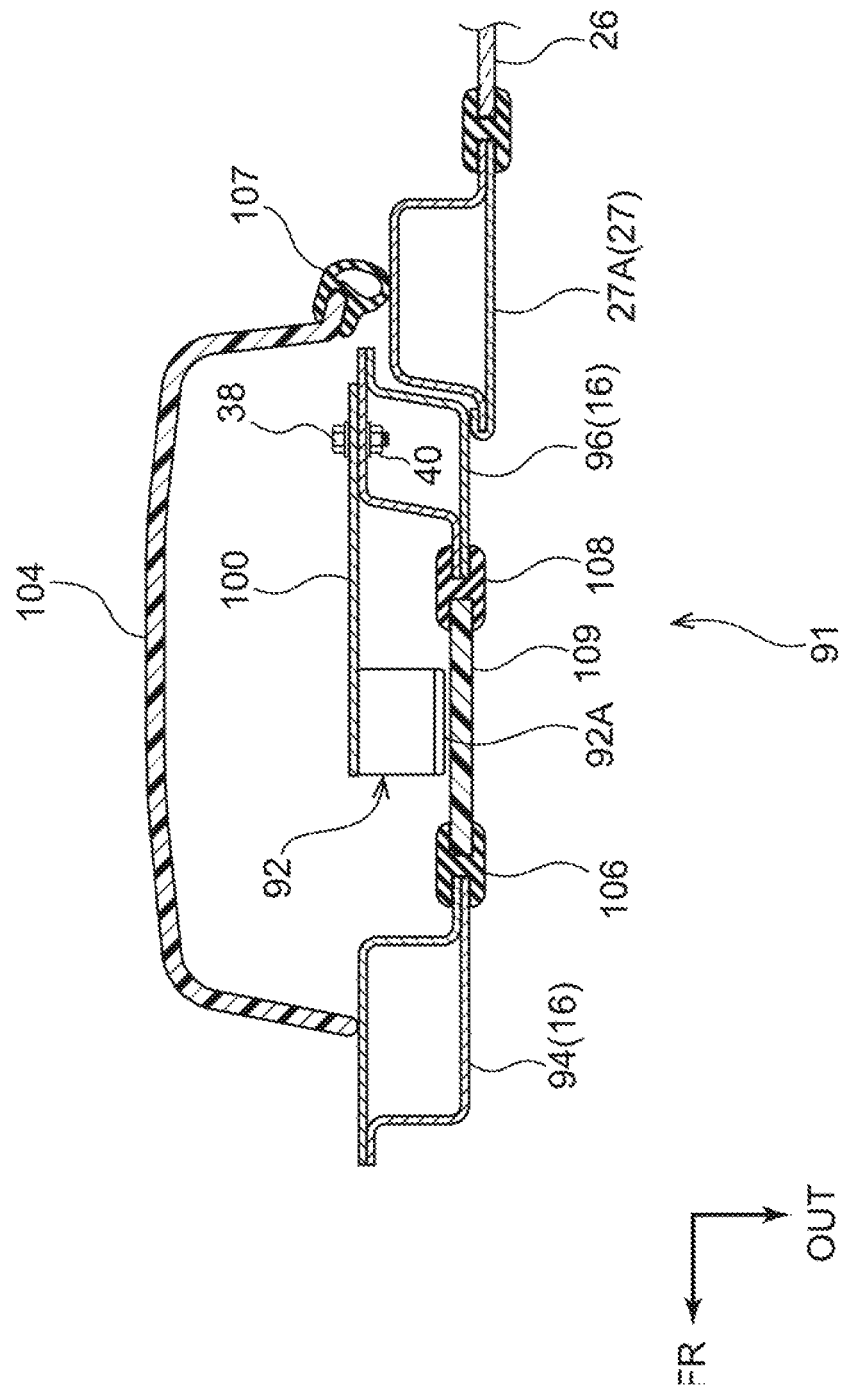
FIG. 13 is a sectional view, corresponding to FIG. 12, showing an example modification of the vehicle in which the peripheral information detection sensor pertaining to the fifth embodiment is installed.

As shown in FIG. 13, in a vehicle 91 of this example modification, the length of the space between the first A-pillar 94 and the second A-pillar 96 is formed shorter than it is in FIG. 12. Additionally, the opaque or translucent resin plate 109 is fixed between the first A-pillar 94 and the second A-pillar 96.

In this example modification, by making opaque or translucent the resin plate 109 as described above, the peripheral information detection sensor 92 can be made unable to be seen or difficult to be seen from the outside of the vehicle 91. Furthermore, the formability of the resin plate 109 is higher than that of glass, so even in a case where the length of the space between the first A-pillar 94 and the second A-pillar 96 is short and a glass cannot be placed therein, the resin plate 109 can be placed therein and the peripheral information detection sensor 92 can be covered from the outside of the vehicle 91.

Sixth Embodiment

Figure 14:
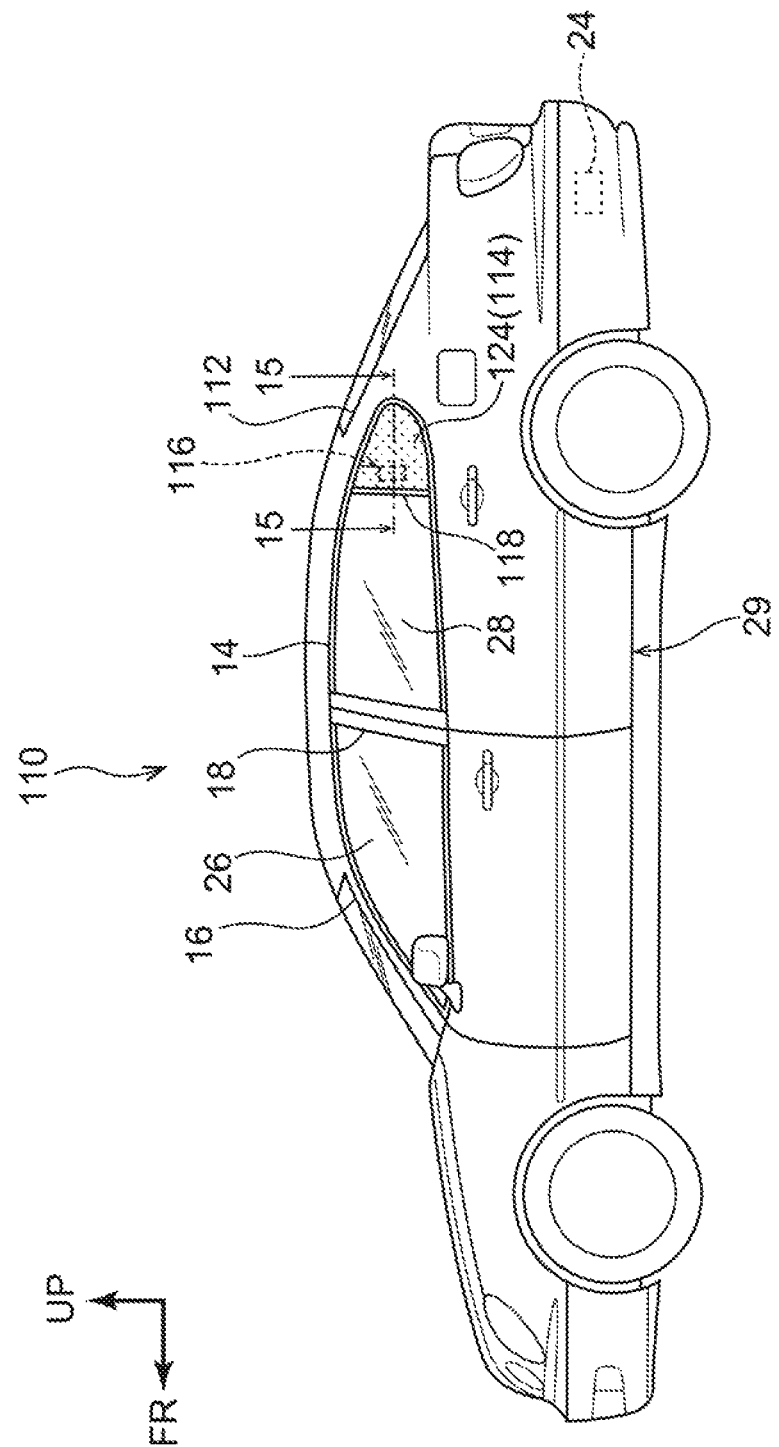
FIG. 14 is a side view of a vehicle in which a peripheral information detection sensor pertaining to a sixth embodiment is installed.

Next, a self-driving vehicle 110 (hereinafter simply called "the vehicle 110") to which a structure disposed with a peripheral information detection sensor 116 pertaining to a sixth embodiment of the present invention has been applied will be described with reference to FIG. 14 and FIG. 15. It should be noted that the vehicle 110 pertaining to the present embodiment has a shape that is different from the shape of the vehicle 10 pertaining to the first embodiment. On the vehicle rear side of the center pillar 18, a rear pillar (a C-pillar) 112 extends from the roof side rail 14 toward the vehicle lower side. Here, the peripheral information detection sensor 116 pertaining to the present embodiment is placed on the cabin interior side of a rear quarter glass 114 serving as a window member disposed on the vehicle rear side of the rear door glass 28.

As shown in FIG. 15, the peripheral information detection sensor 116 is attached by means of a bracket 117 to a door sash portion 29A serving as a window frame portion. Specifically, the door sash portion 29A extends from the upper end portion of the rear side door 29 toward the vehicle upper side, and the bracket 117 is fastened by the bolt 38 and the nut 40 to the vehicle width direction inside of the door sash portion 29A. Additionally, the bracket 117 extends from the door sash portion 29A toward the vehicle front side, and the peripheral information detection sensor 116 is attached to the front end portion of the bracket 117.

Furthermore, the peripheral information detection sensor 116 is equipped with a detection component 116A that detects peripheral information relating to the area around the vehicle 110. The detection component 116A faces outward in the vehicle width direction.

The rear quarter glass 114 is placed on the vehicle width direction outside of the peripheral information detection sensor 116, so that the peripheral information detection sensor 116 is covered from the outside of the vehicle 110 by the rear quarter glass 114. Furthermore, the rear quarter glass 114 is a fixed window fixed between a weather strip 118 and a weather strip 120.

Here, the rear quarter glass 114 is configured by colored glass, and the entire surface of the rear quarter glass 114 is opaque or translucent.

Furthermore, a trim 122 serving as an interior member is disposed on the cabin interior side of the door sash portion 29A. The trim 122 is formed in a cross-sectionally substantially U-shape that opens outward in the vehicle width direction. In the present embodiment, the trim 122 is formed of a resin material. Additionally, the peripheral information detection sensor 116 is covered from the cabin interior side by the trim 122. Furthermore, the trim 122 is in contact with a weather strip 125 disposed on the rear pillar 112.

(Action and Effects)

Next, the action and effects of the vehicle 110 equipped with the peripheral information detection sensor 116 pertaining to the present embodiment will be described. In the present embodiment, by making opaque or translucent the rear quarter glass 114 that covers the peripheral information detection sensor 116 from the outside of the vehicle 110, the peripheral information detection sensor 116 can be made unable to be seen or difficult to be seen from the outside of the vehicle 110. Other effects are the same as those of the first embodiment.

The first embodiment to the sixth embodiment of the present invention have been described above, but the present invention is not limited to the configurations described above and can of course be implemented in a variety of ways other than those described above without departing from the spirit thereof. For example, in the above embodiments, configurations where the peripheral information detection sensor is placed on the left side of the vehicle have been described, but the present invention is not limited to this. For example, the peripheral information detection sensor may also be placed on the right side of the vehicle, and a pair of the peripheral information detection sensors may also be placed on the right side and the left side of the vehicle. Furthermore, the structures in the above embodiments may also be combined. For example, the present invention may also have a structure where the peripheral information detection sensor is placed on the rear quarter glass and the front quarter glass.

Furthermore, in the above embodiments, the entire surface of the glass is made opaque or translucent by using colored glass, and the outer peripheral portion of the glass is made opaque by disposing the ceramic processed portion, but the present invention is not limited to this. For example, in FIG. 1, the rear quarter glass 30 may also be formed of frosted glass or figured glass and made opaque. Furthermore, an opaque or translucent smoke film may also be adhered to the glass to make the glass opaque or translucent. Moreover, the shape and size of the peripheral information detection sensor in the above embodiments as well as the position and shape of the detection component are not particularly limited and may be appropriately changed in accordance with the type of peripheral information detection sensor and the position where it is placed.

What is claimed is:

1. A structure disposed with a peripheral information detection sensor, the structure comprising:
    a peripheral information detection sensor that is disposed at a window frame portion of a side surface of a vehicle and that is equipped with a detection component that detects peripheral information relating to an area around the vehicle;
    a window member that is attached to the window frame portion and covers the peripheral information detection sensor from an exterior of the vehicle, with at least part of a section of the window member that opposes the peripheral information detection sensor being opaque or translucent; and
    an interior member that has an opening configured to open toward an outer-side of the vehicle, the interior member covering the peripheral information detection sensor such that the interior sensor is not exposed to a cabin interior side of the vehicle.

2. The structure disposed with a peripheral information detection sensor of claim 1, wherein the window member is fixed to the window frame portion.

3. The structure disposed with a peripheral information detection sensor of claim 1, wherein a section of the window member that opposes the detection component is transparent, and the section of the window member that opposes the peripheral information detection sensor, excluding the section that opposes the detection component, is opaque or translucent.

4. The structure disposed with a peripheral information detection sensor of claim 1, wherein the interior member is formed by an electrically conductive member.

5. The structure disposed with a peripheral information detection sensor of claim 1, wherein the interior member is formed in a cross-sectional U-shape that opens outward in a vehicle width direction.

* * * * *